United States Patent [19]

Norton et al.

[11] Patent Number: 4,723,647
[45] Date of Patent: Feb. 9, 1988

[54] BELT CONVEYOR AND FEEDER

[75] Inventors: Larry A. Norton, Elkhorn, Wis.; Donald G. Wells, Harvard, Ill.

[73] Assignee: Starline Products, Inc., Harvard, Ill.

[21] Appl. No.: 725,222

[22] Filed: Apr. 19, 1985

[51] Int. Cl.$^4$ .............................................. B65G 47/34
[52] U.S. Cl. ................................. 198/364; 198/816; 119/52 B
[58] Field of Search ............... 198/364, 816, 813, 814, 198/823; 119/52 B

[56] References Cited

U.S. PATENT DOCUMENTS

| | | | |
|---|---|---|---|
| 832,361 | 10/1906 | Blevins | 198/816 |
| 2,099,071 | 11/1937 | Lundbye | 198/364 |
| 2,168,622 | 8/1939 | Levin | 198/816 |
| 2,295,401 | 9/1942 | Hansen | 198/816 |
| 2,513,088 | 6/1950 | Ferris | 16/94 |
| 2,631,715 | 3/1953 | Vickers | 198/816 |
| 2,648,424 | 8/1953 | Bateman | 198/814 |
| 2,702,115 | 2/1955 | Cunningham | 198/823 |
| 3,237,807 | 3/1966 | Garvey | 198/364 |
| 3,306,261 | 2/1967 | Purdy | 198/529 |
| 3,443,547 | 5/1969 | Ferris et al. | 119/52 B |
| 3,443,678 | 5/1969 | Reilly | 198/823 |
| 3,523,606 | 8/1970 | Oury | 198/364 |
| 3,590,983 | 7/1971 | Oury | 198/813 |
| 3,672,334 | 6/1972 | Scheppele | 119/52 B |
| 3,911,867 | 10/1975 | Berg, Jr. | 119/52 B |
| 4,213,525 | 7/1980 | Scheppele | 198/364 |
| 4,215,776 | 8/1980 | Esler | 198/823 |
| 4,280,619 | 7/1981 | Ward et al. | 198/823 |
| 4,320,825 | 3/1982 | Buschbom et al. | 198/364 |
| 4,576,117 | 3/1986 | Garter et al. | 198/364 |
| 4,593,651 | 6/1986 | McCarthy et al. | 198/364 |

FOREIGN PATENT DOCUMENTS 642691 5/1964 Belgium .............................. 198/816

*Primary Examiner*—Robert J. Spar
*Assistant Examiner*—D. Glenn Dayoan
*Attorney, Agent, or Firm*—Wood, Dalton, Phillips, Mason & Rowe

[57] ABSTRACT

An improved endless belt conveyor apparatus includes a supporting frame in the form of a pair of parallel longitudinal carrier rails that flank the endless belt in a plane below the upper carrying run of the belt. The carrier rails extend continuously from end-to-end of the conveyor and have uninterrupted trolley supporting portions that are adapted to support wheeled trolleys for movement therealong. The apparatus may be readily converted from a belt conveyor to an animal feeding apparatus that includes a reciprocating plow assembly by mounting such a plow assembly in a carriage that has wheeled trolleys that ride on the trolley supporting portions of the carrier rails. The conveyor frame structure also permits easy addition of the drive components for the reciprocating carriage.

19 Claims, 16 Drawing Figures

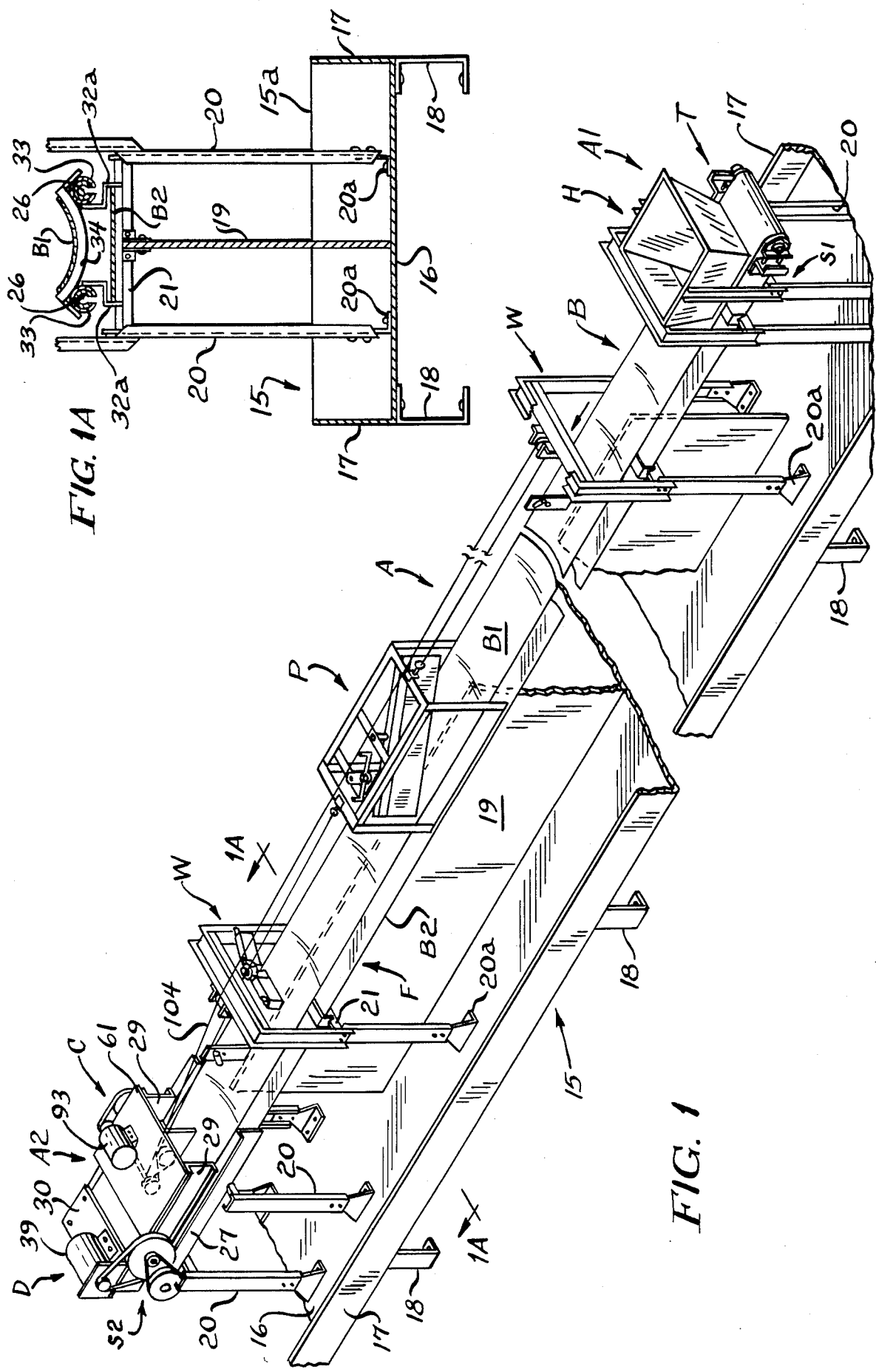

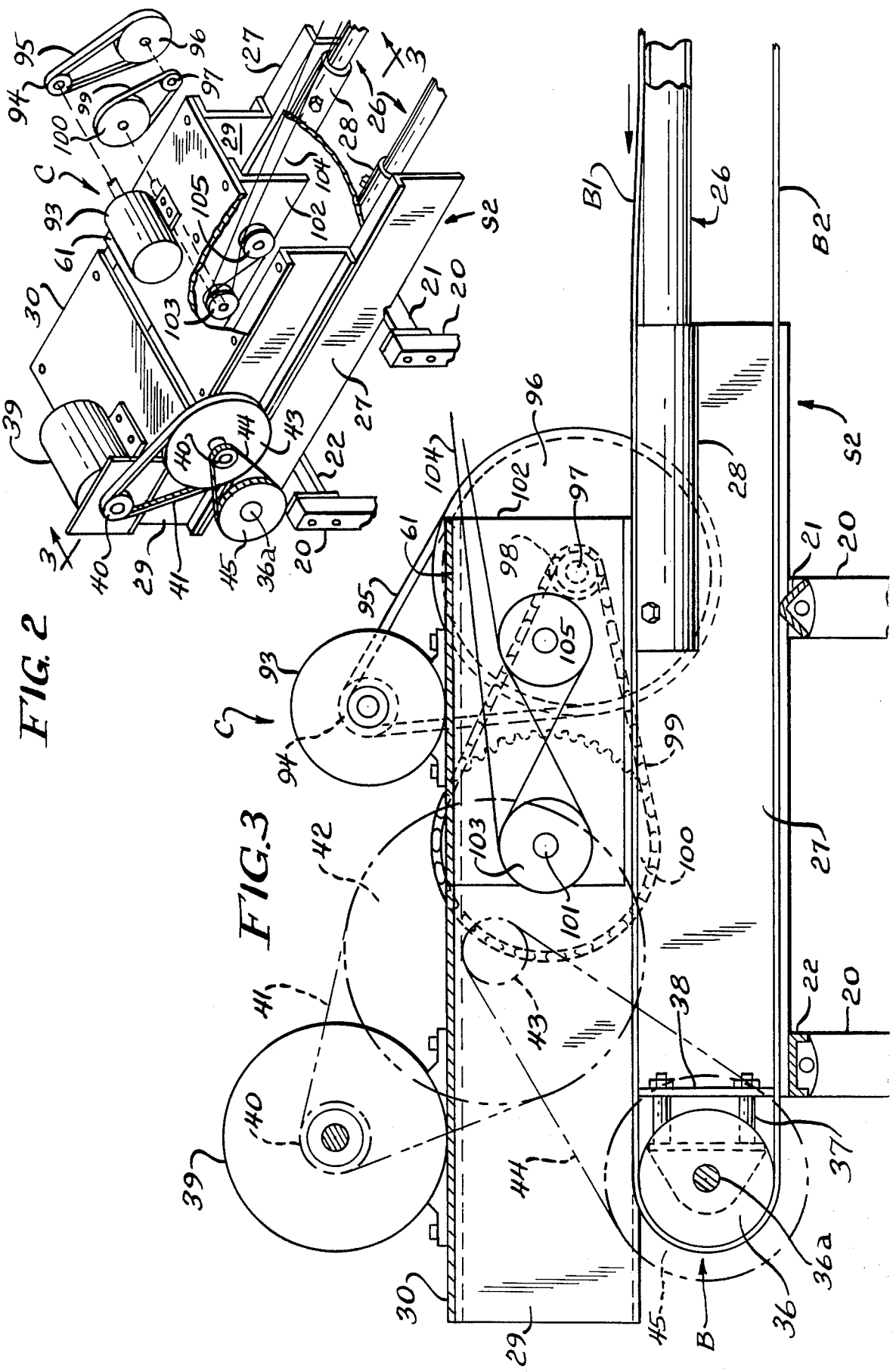

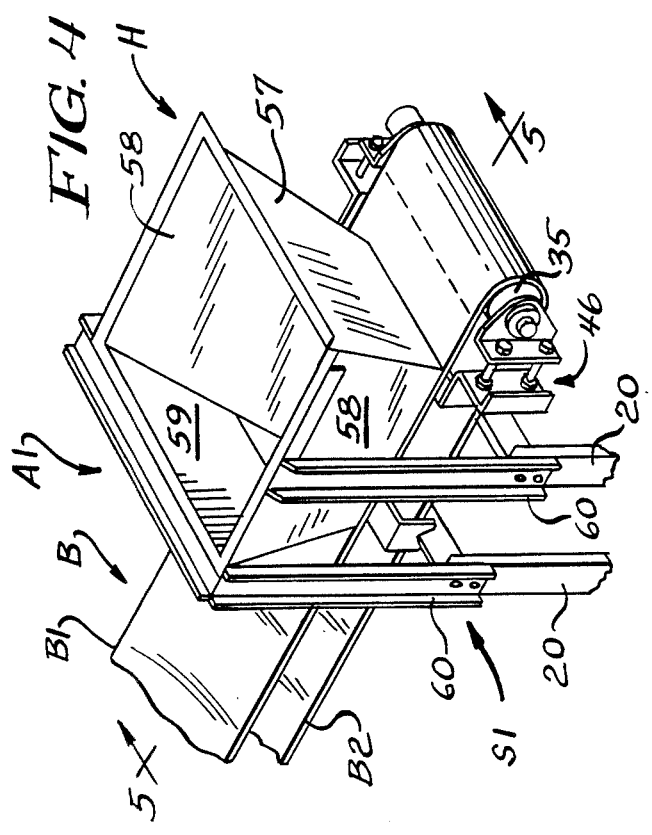
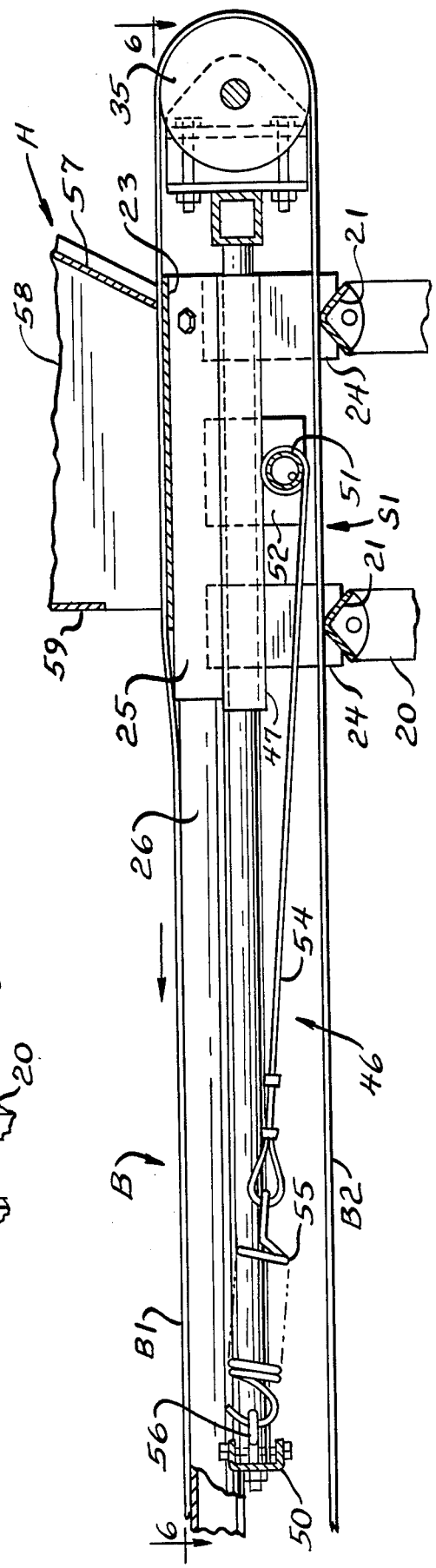

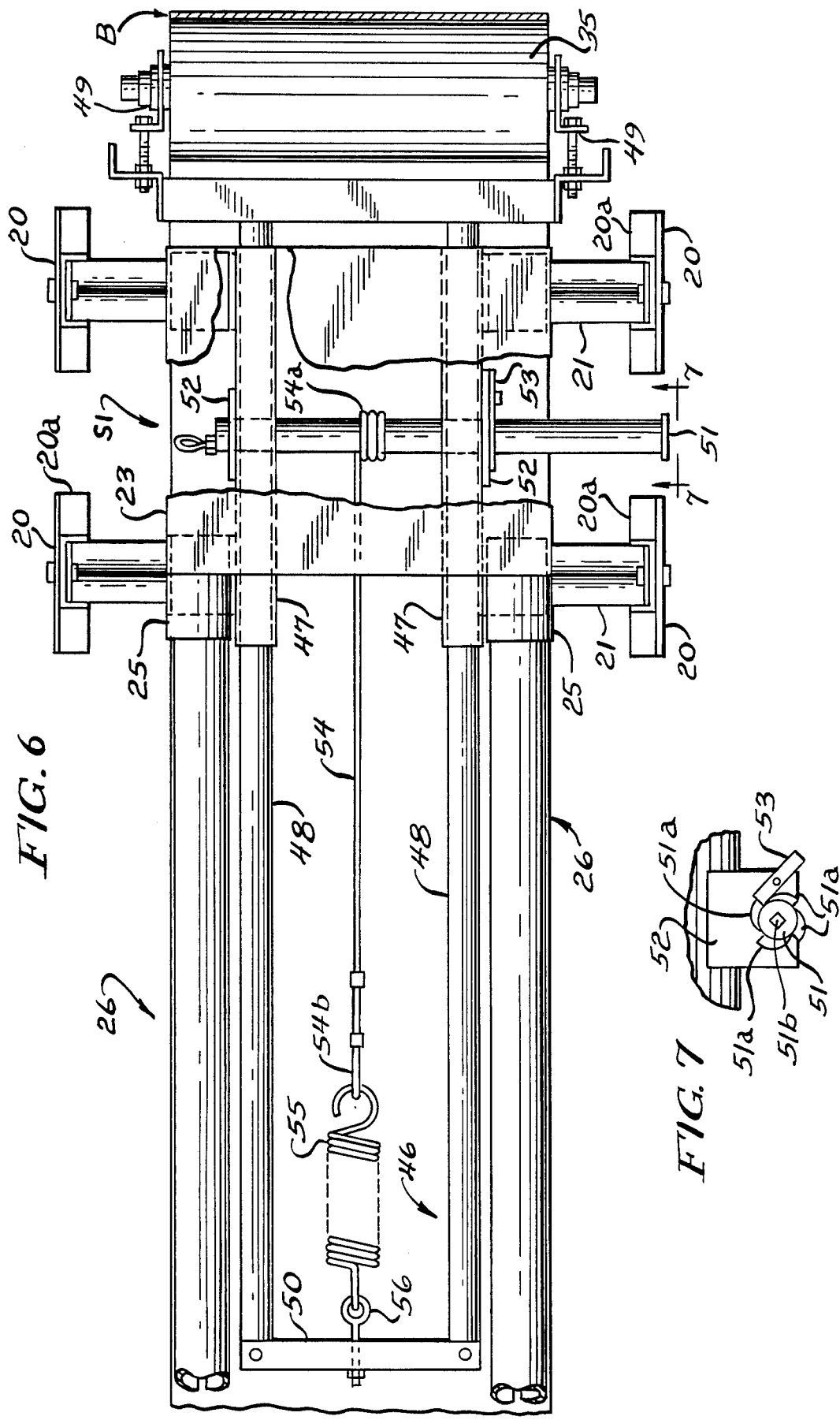

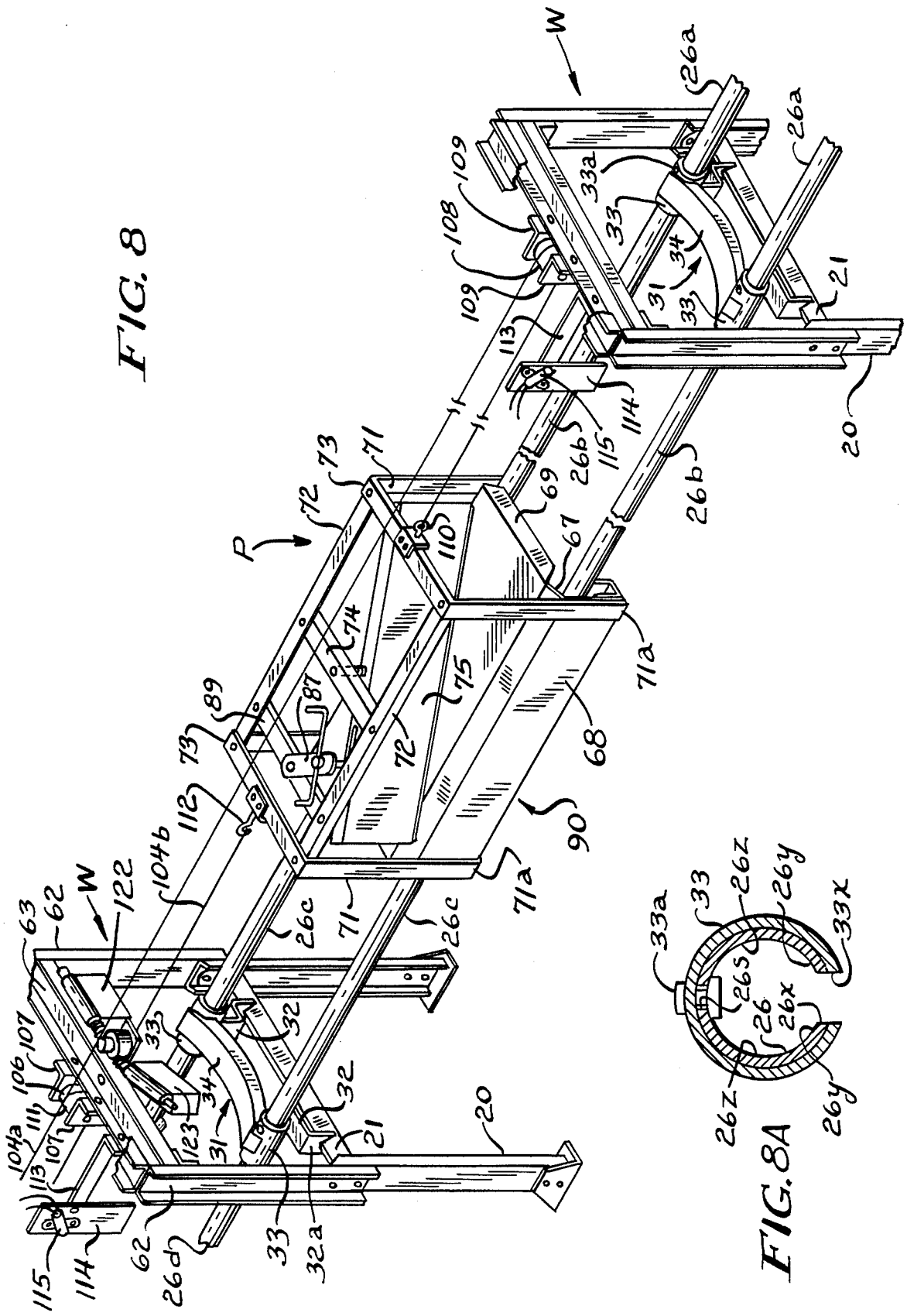

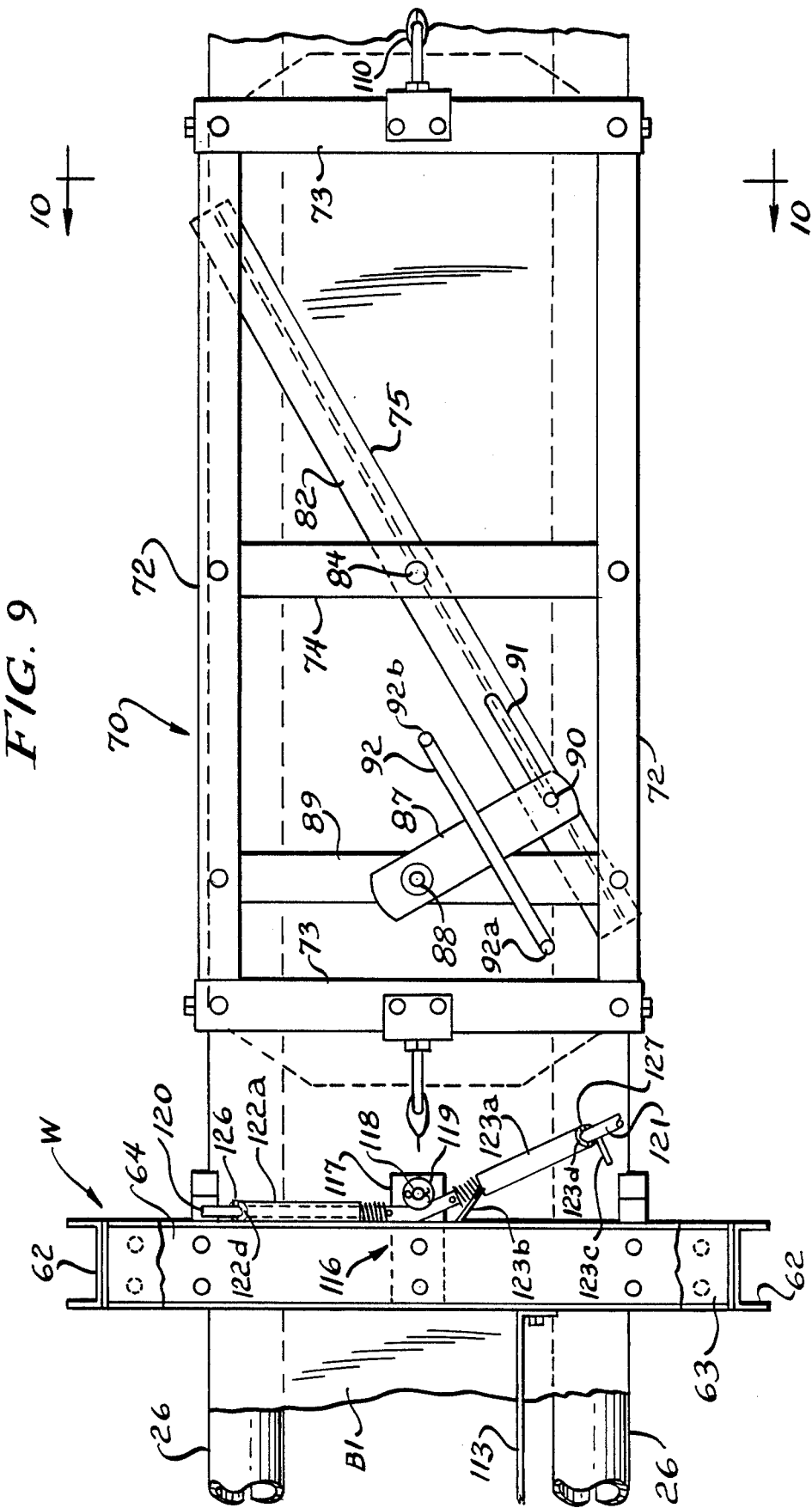

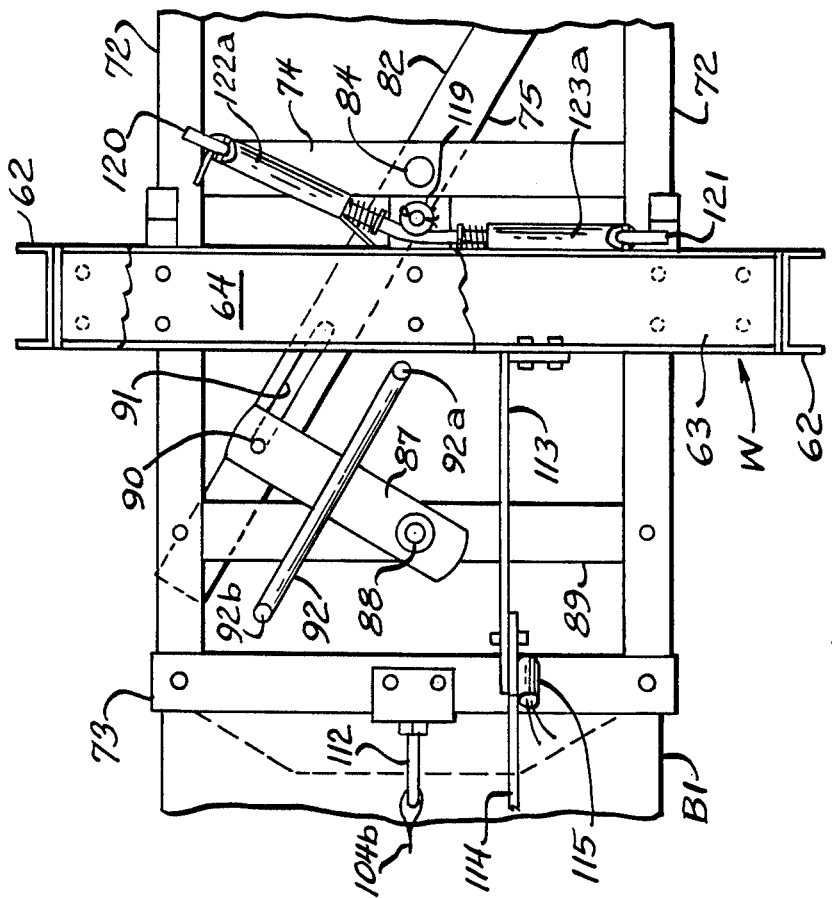
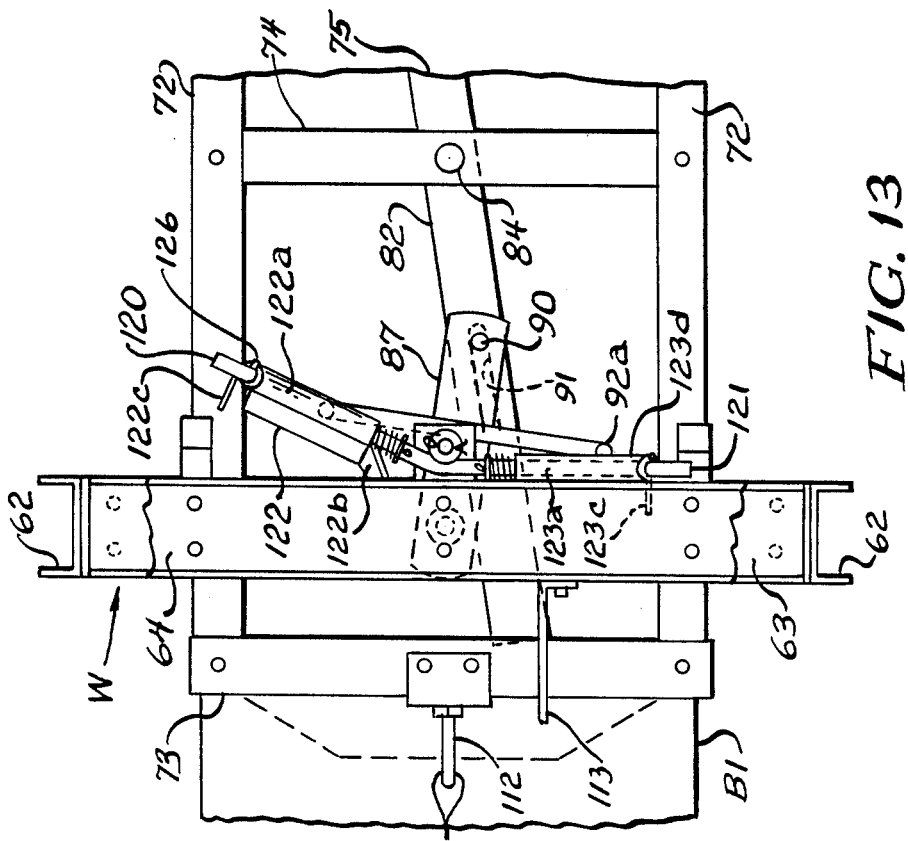

BELT CONVEYOR AND FEEDER

BACKGROUND OF THE INVENTION

There are various circumstances, particularly in the agricultural equipment industry, where it is desirable to have a basic endless belt conveyor apparatus which may easily have parts added to it to convert it to an animal feeder of the type that runs above a feed bunk and has a reciprocating plow to discharge material off both sides of the belt into the feed bunk. Such readily convertible equipment is especially desirable in the agricultural equipment industry because a great deal of the assembly of such equipment is performed by a farmer, and this makes simplicity of assembly and conversion of primary importance.

It is also desirable, of course, for any equipment that must be shipped knocked down (KD) and field assembled to have simple, easily assembled parts, and to have a minimum number of parts so as to reduce shipping weight and complexity of assembly. Likewise, equipment designed for use in a farm environment, where it is necessarily subjected to rough use and inclement weather, must have a minimum of assemblies requiring close tolerances.

The apparatus of the present invention meets the foregoing criteria.

The prior art known to applicants and their attorneys which is the most pertinent to the present apparatus includes Purdy U.S. Pat. Nos. 3,306,261 and Shepley 3,672,334. Both such patents relate to belt type animal feeders that have a reciprocating plow for discharging material from the sides of the belt throughout the length of a feed bunk.

SUMMARY OF THE INVENTION

The present invention constitutes an improvement upon the type of endless belt conveyor apparatus that includes a supporting frame, an endless belt carried on the frame that has an upper carrying run and a return run, means at a first end of the endless belt to pour bulk material onto the upper carrying run, and means for driving the belt from the first end toward a second end for discharge of material to a bulk material receiving means. In accordance with the improvement, the frame comprises a pair of parallel longitudinal carrier rails that flank the endless belt in a plane below the upper carrying run, and the carrier rails extend continuously from a first end in the vicinity of the first end of the belt to a second end in the vicinity of the second end of the belt, and the carrier rails have uninterrupted generally transversely extending trolley supporting portions that are adapted to support wheeled trolleys for movement therealong, and said carrier rails also have uninterrupted, integral, generally upwardly extending trolley confining portions. Standards at intervals along the carrier rails support the latter in a plane above that of the bulk material receiving means, and the endless belt is supported on the carrier rails.

In a preferred embodiment of the invention, the carrier rails are box-like tracks that are circular in cross section and have their trolley supporting portions flanking a continuous split in the lower part of the track and their trolley guiding and confining portions flanking the supporting portions.

Conversion of the conveyor apparatus to an animal feeding apparatus that includes a reciprocating plow assembly is easily accomplished by mounting a reciprocating plow assembly in a carriage that has wheeled trolleys that ride on the trolley supporting portions of the longitudinal carrier rails alongside the trolley confining portions.

The endless belt conveyor apparatus has an electric drive motor carried on a bridge frame above the second end portion of the endless belt; and when a reciprocating carriage is added to the apparatus the bridge frame is extended a short distance to receive a reversible electric motor that powers a cable drive for the plow assembly carriage.

The endless belt conveyor apparatus also has a particularly simple and rugged mechanism for tensioning the endless conveyor belt.

THE DRAWINGS

FIG. 1 is a perspective view of an endless belt conveyor apparatus and reciprocating plow mounted in a feed bunk, with some details omitted for simplicity of illustration and with the central part of the apparatus broken away;

FIG. 1A is a fragmentary sectional view taken substantially as indicated along the line 1A—1A of FIG. 1;

FIG. 2 is a fragmentary sectional view of the drive for the apparatus with parts exploded for clarity of illustration;

FIG. 3 is a fragmentary, longitudinal sectional view on an enlarged scale taken substantially as indicated along the line 3—3 of FIG. 2;

FIG. 4 is a fragmentary perspective view illustrating the material feeding and conveyor belt tensioning end portion of the apparatus;

FIG. 5 is a fragmentary sectional view on an enlarged scale taken substantially as indicated along the line 5—5 of FIG. 4;

FIG. 6 is a fragmentary horizontal sectional view taken substantially as indicated along the line 6—6 of FIG. 5 with the feed bunk omitted;

FIG. 7 is a fragmentary end elevational view taken substantially as indicated along the line 7—7 of FIG. 6;

FIG. 8 is a fragmentary perspective view of the apparatus with the central area broken away and the belt omitted for clear illustration of the supporting frame, and with the feed bunk omitted;

FIG. 8A is an end elevational view of a splice bracket sleeve and a carrier rail length supported therein;

FIG. 9 is a fragmentary plan view showing the plow carriage and the mechanism for shifting the plow plate between the position of FIG. 9 and the position of FIG. 14;

Figure 10:
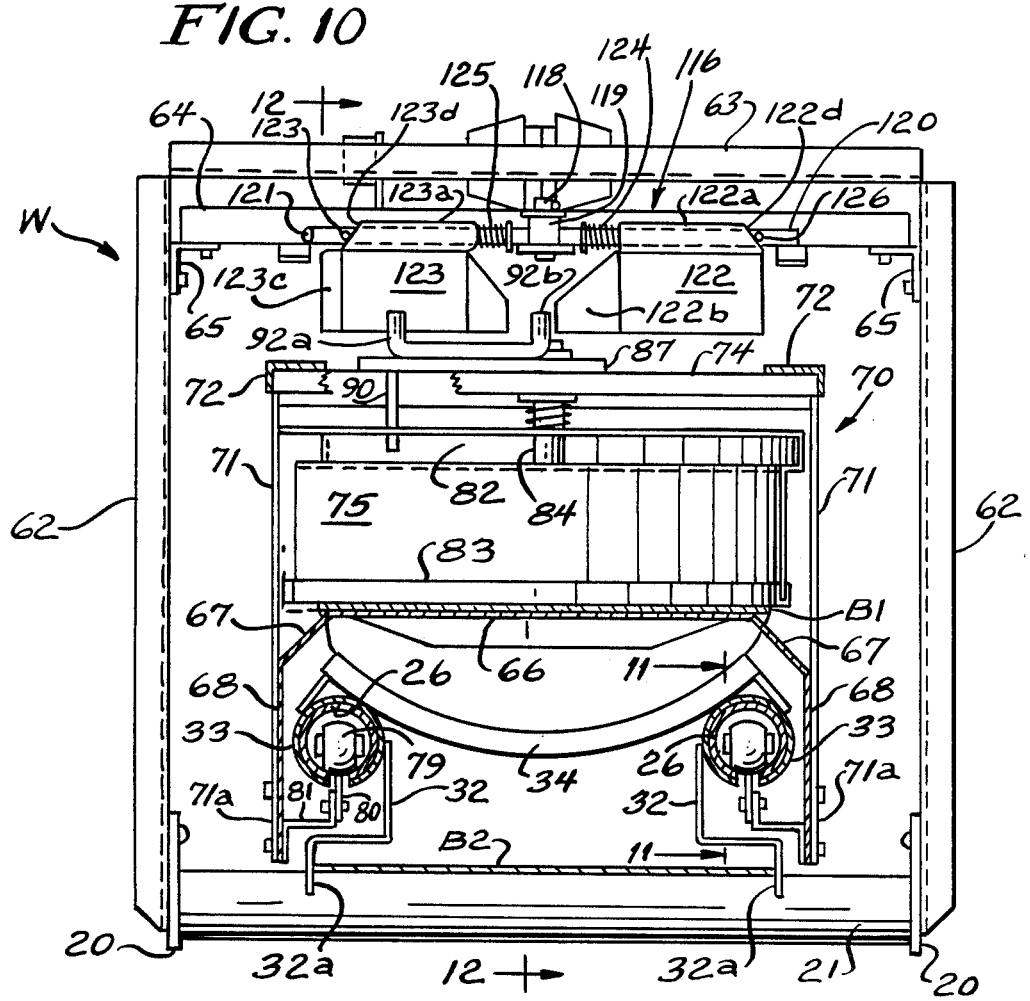
FIG. 10 is a fragmentary sectional view taken substantially as indicated along the line 10—10 of FIG. 9.

FIG. 13 is a fragmentary plan view illustrating an end portion of the reciprocating plow carriage and the mechanism for reversing the orientation of the plow plate, with the latter in an intermediate position between the position of FIG. 9 and the position of FIG. 14; and FIG. 14 is a fragmentary plan view similar to FIG. 9 showing the plow plate in its reverse position and the plow carriage at one extreme end of its reciprocating path.

THE PREFERRED EMBODIMENT OF THE INVENTION

Referring to the drawings in detail, and referring first to FIGS. 1 and 1A, the apparatus of the present invention is illustrated mounted in a conventional feed bunk, indicated generally at 15, that has a floor 16 and sidewalls 17 supported on legs 18. A wind board 19 extends along the longitudinal median plane of the feed bunk in the usual way. One of two feed bunk end walls is 15a in FIG. 1A.

The Conveyor Apparatus Generally

The present invention consists generally of an endless belt conveyor apparatus, indicated generally at A, that has a supporting frame, indicated generally at F, there being a first end portion A1 of the belt conveyor apparatus that has a material feed hopper indicated generally at H and belt tensioning means indicated generally at T (see particularly FIGS. 4, 5 and 6), and a second end portion A2 where there is located a belt drive, indicated generally at D (see particularly FIGS. 2 and 3). The foregoing are the principal components of the endless belt conveyor apparatus.

The Belt Feeder Conversion Generally

Conversion of the endless belt conveyor apparatus to a belt feeder requires the addition of a plow assembly, indicated generally at P, several arch weldments, indicated generally at W, that support various plow control components and serve as intermediate supports for the cables of a plow cable drive, indicated generally at C.

The apparatus of the invention is illustrated in a feed bunk because that is the way in which it is normally used when it is provided with the plow assembly. However, it is apparent that when the apparatus is operated as a belt conveyor for bulk material, without the plow, it may be inside a farm building or outdoors. Such conveyors may be used, for example, to move bulk material to or from a silo or other storage facility, or in such other ways as may be desirable in any particular farming operation.

The Conveyor Apparatus in Detail

Turning now particularly to FIGS. 1 to 6, the frame F of the apparatus is supported upon a plurality of standards 20 each of which has feet 20A by means of which it may be fixedly secured to a supporting surface such as the bottom 16 of the feed bunk. At the upper ends of the standards 20 are cross members 21 all of which are angle members with the apex upward, except for an end standard cross member 22 which is in the form of a channel (FIG. 3). Supported atop the standards 20 is the frame F which, at the first end portion A1 of the apparatus, is seen in FIG. 6 to consist of a first frame end assembly S1 that includes a transverse plate 23 that has downturned front and rear side flanges 24 by means of which it is mounted upon two of the cross members 21. Sleeves 25 are secured to the plates 24 and serve as sockets for a first end of a pair of carrier rails, indicated generally at 26.

As seen in FIGS. 2 and 3 at, the second end portion A2 of the apparatus a second frame end assembly S2 that has longitudinal side beams 27 that are welded to a cross member 21 and to the cross member 22, and sleeves 28 on the side beams serve as sockets for a second end of the carrier rails 26. Surmounting the side beams 27 are upper beams 29 and a drive motor support plate 30 that cooperate with the upper beams to form a bridge frame.

As best seen in FIGS. 8 and 10, on the cross members 21 of the standards 20 between the end portions A1 and A2 of the apparatus there are carrier rail splice brackets, indicated generally at 31, each of said brackets 31 consisting of angle members 32 that have upright webs 32a (FIG. 1A) welded to the cross members 21 and carry fittings 33 which, in the preferred embodiment illustrated, are sleeves which receive the end portions of two adjacent rail lengths which, in FIG. 8, are indicated as rail lengths 26a, 26b, 26c, and 26d. Each splice bracket includes a transverse web 34 which is in the form of a shallow, upwardly concave arc. Thus, each of the carrier rails 26 consists of any required number of rail lengths connected by splice brackets 31.

An endless conveyor belt which is seen in FIGS. 1 and 1A to have an upper carrying run B1 and a lower return run B2 is supported at the first end portion A1 of the apparatus upon an idler roller 35 (FIGS. 5 and 6) and at the second end portion A2 is supported upon a drive roller 36 (FIG. 2). The upper carrying run B1 of the belt B is best seen in FIG. 1A to curve downwardly to conform to the arc of the transverse webs 34. The angle member upright webs are seen in FIG. 1A to confine the lower return run B2 of the belt B, which runs on the cross members 21 of the standards 20.

As best seen FIG. 8A, each of the brackets 33, has a aligning rivet 33a set in the top, and each track length has an end slot 26s which interfits with the rivet 33a so that continuous splits 26x in the track lengths are aligned with one another and with splits 33x in the splice bracket collars 33.

Thus, the several carrier rail lengths 26a, 26b, etc., all cooperate to form a pair of parallel longitudinal carrier rails that flank the endless belt B in a plane below the upper carrying run B1, and the carrier rails extend continuously from a first end in the collars 25 (FIG. 6) to a second end in the collars 28 (FIGS. 2 and 3). The carrier rails have uninterrupted generally transversely extending trolley supporting portions 26y, alongside the splits 26x, that are adapted to support wheeled trolleys for movement therealong, and they also have uninterrupted, integral, generally upwardly extending trolley confining portions 26z which flank the supporting portions 26y.

The carrier rail sections 26a, 26b, etc. serve as integral parts of the supporting frame for the conveyor apparatus, and their split tubular structure provides a frame which is very light and very strong.

If necessary additional belt supports (not shown) may be mounted upon the carrier rail length between the splice brackets 31; and if such additional belt supports are required they consist merely of sleeves like the sleeves 33 but without the aligning rivets 33a, and an upwardly concave web 34 connecting sleeves. Such extra belt supports are slid onto two rail lengths before the rail lengths are connected to the splice brackets 33, and each such belt support has set screw to fix it in place on the rail lengths.

Turning now to FIGS. 2 and 3, the driven roller 36 for the belt B has a shaft 36a the ends of which are journalled in brackets 37 that are mounted upon a frame end plate 38. Mounted upon the drive motor support plate 30 is an electric motor 39 on the shaft of which is a sheave 40 for a toothed belt 41 that is also trained about a transfer sheave 42. Keyed to the transfer sheave 42 is a sprocket 43 for a drive chain 44 that is also trained around a drive sprocket 45 on the roller shaft 36a. The motor 39, acting through the power train just described, drives the belt B so that its upper carrying run B1 moves in the direction of the arrows in FIGS. 1, 3 and 5.

Turning now to FIGS. 4 to 7, the idler roller 35 for the first end of the endless belt B is carried upon an idler roller carrier assembly, indicated generally at 46, that serves as an adjusting means for the idler roller 35 to permit adjustment of the tension of the belt B. A pair of tubular guideways 47 are fixed to the supporting frame and carry the idler roller carrier assembly 46 that comprises a pair of parallel support rails 48 slidably mounted in the guideways 47, journal means 49 journalling the idler roller 35 in an end of the support rails 48 remote from the driven roller 36, and a cross bar 50 that connects the support rails 48 at their ends opposite the idler roller 35. A manually rotatable cross shaft 51 is journalled in brackets 52 on the guideways 47, and as seen in FIG. 7 the shaft 51 has ratchet lobes 51a that are engaged by a pivoted latching detent 53. A cable 54 has one end portion 54a wrapped around the manually rotatable cross shaft 51 and has its opposite end 54b connected to a tension spring 55 which in turn is connected by an I-bolt 56 to the cross bar 50 of the idler roller carrier assembly 46. Thus, rotation of the manually rotatable shaft 51 in a predetermined direction which winds the cable 54 about the shaft pulls the carrier assembly 46 in a direction to increase the distance between the idler roller 35 and the driven roller 36, and thus tension the belt B. As seen in FIG. 7 the manually rotatable shaft 51 has a square socket 51B in its outer end to receive a square shafted tool.

Referring particularly to FIG. 4, the hopper H has an inclined end wall 57, inclined sidewalls 58, and an upright front wall 59; and the hopper is supported upon a pair of channel frames 60 that are secured to the two standards 20 at the first end portion A1 of the apparatus A. Thus, bulk material such as animal feed may be poured from the hopper H onto the upper carrying run B1 of the endless belt B and moved toward the second end of the endless belt where it spills off into any appropriate bulk material receiving means such, for example, as a storage bin or a truck body.

Customarily housings are erected around the first and second end portions A1 and A2 of the apparatus to shield the idler roller and belt where it is moving in contact with the bottom of the hopper, and also to shield the power train from the drive motor 39 to the driven shaft 36a. Conveniently 2×6's are fastened to the standards 20 by means of angle brackets that bolt to the standards, and sheet metal side and end plates are secured to the 2×6's. At the second end A2 a top plate is connected to the side plates and the end plate to protect the motor 39 and the power train from weather, and to make it virtually impossible for a person to reach into the moving drive belts and chains.

The Belt Feeder Conversion in Detail

The details of the apparatus converted to operation as a belt feeder are best seen in FIGS. 2, 3, and 8 to 14.

Additions to the frame include the arch weldments W which are best seen in FIGS. 8 to 10, and a mounting plate 61 for the plow cable drive C which is seen in FIGS. 2 and 3 to be mounted upon the upper beams 29 immediately adjacent the drive motor support plate 30.

Each of the arch weldments W consists of a pair of upright channel members 62 that are connected by a top channel 63, and the upright channels 62 bolt to the standard legs 20. Transverse supporting channels, such as the number 64 in FIG. 10, are carried upon angle brackets 65 and serve to support various control components for operating the plow assembly P.

Referring now particularly to FIGS. 8 to 10 and 12, the plow assembly P is seen to consist of a floor panel 66 which has inclined marginal portions 67 that terminate in upright side panels 68, and inclined end margins 69. The upper carrying run B1 of the belt is supported upon the plow assembly floor panel 66 in the area that is being traversed by the plow assembly. The floor panel 66 and side panels 68 are parts of a box-like carriage frame, indicated generally at 70, that also includes legs 71 having depending portions 71a at opposite sides of the carrier rails 26 and at opposite ends of the box-like frame 70. Also forming parts of the box-like frame are longitudinal bars 72 which have their opposite ends connected to the upper ends of the legs 71, and end cross bars 73 between the upper ends of the legs 71 at each end of the carriage. An intermediate cross bar 74 connects the longitudinal bars 72 and supports a plow plate 75.

Figure 11:
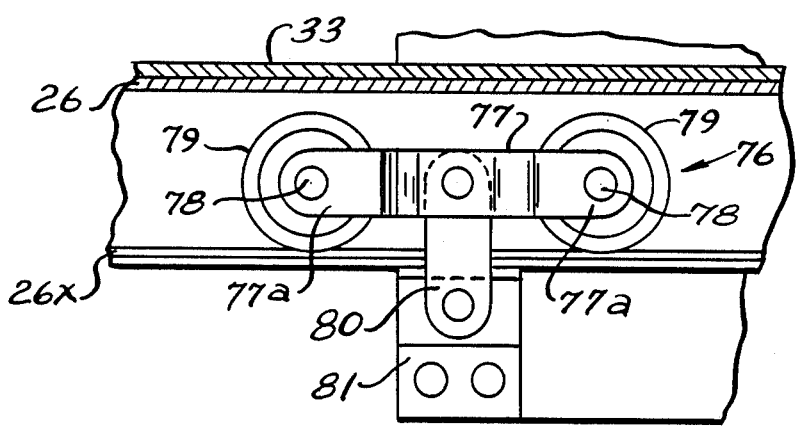
FIG. 11 is a fragmentary sectional view taken substantially as indicated along the line 11—11 of FIG. 10.
Figure 12:
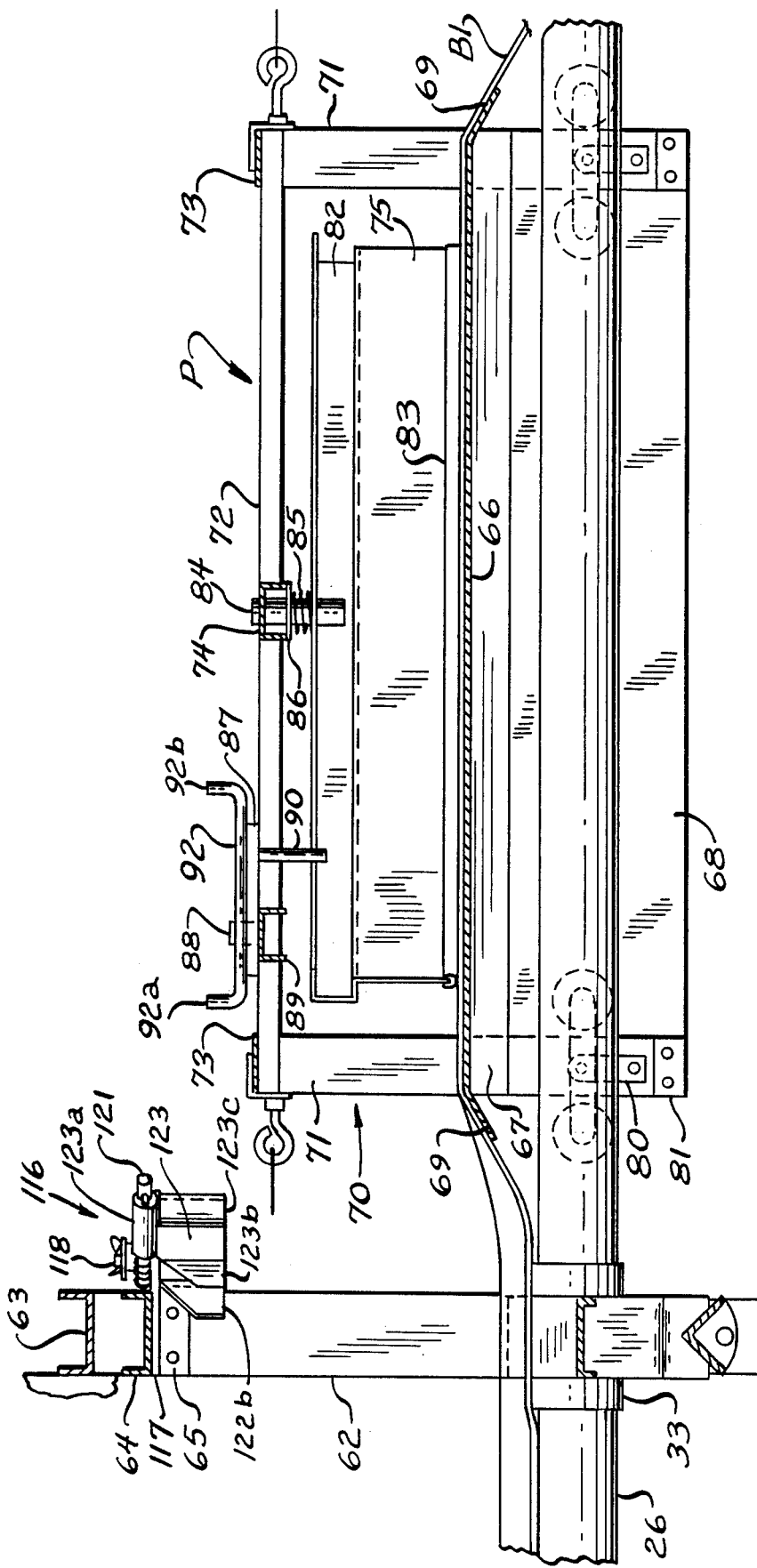
FIG. 12 is a fragmentary sectional view taken substantially as indicated along the line 12—12 of FIG. 10.

The lower end portions 71a of the legs 71 are bolted to the extreme lower marginal portions of the panels 68, and are also connected to wheeled trolley assemblies, indicated generally at 76, which are best seen in FIG. 11. Each of the trolley assemblies 76 consists of a longitudinal trolley frame 77 that has bifurcated end portions 77a that carry spindles 78 upon which trolley wheels 79 are journalled. Depending from the trolley frame 77 between the wheels 79 is a carriage hanger 80 that includes a laterally outwardly projecting support arm 81 to which the lower end portions 71a of the carriage leg 71 are bolted or riveted. As seen in FIG. 10, the trolley wheels 79 are wide enough to rest in the track 26 on the trolley supporting portions 26y of the track that are on opposite sides of the longitudinal split 26x, and the transversely curved running surfaces of the trolley wheels make them self-centering in the track so that the trolley confining portions 26a of the tracks serve only to prevent gross displacement of the trolleys.

Assembly of the plow carriage with the conveyor assembly A is very easily accomplished by running the trolleys into the ends of two track lengths that are supported only at one end, and then mounting the open ends of the track lengths in the splice bracket collars 33. The belt B is threaded through the carriage frame 70 above the bottom panel 66 after the tracks 26 are completely assembled with the two frame end portions.

The plow plate 75 has its upper end portion formed into a channel configuration 82, and along the bottom of the plow plate is a U-shaped wear strip 83. A fixed pivot pin 84 in the channel configuration 82 at the top of the plow plate extends upwardly through a centrally positioned hole in the intermediate cross bar 74 of the plow carriage, and a compression spring 85 that surrounds the pivot pin 84 urges the plow wear strip 83 firmly into contact with the upper carrying run B1 of the belt B.

The plow plate 75 is movable between a firstt position that is illustrated in FIGS. 8 and 9, and a second position that is illustrated in FIG. 14, so that the plow plate may move bulk material off of either side of the upper carrying run B1 of the belt. To accomplish this, a link 87 is pivotally mounted at 88 on a cross member 89 that is near one end of the carriage frame 70, and a pin 90 on the free end of the link 87 is loosely engaged in a slot 91 in the channel formation 82 at the top of the plow plate 75. A plow plate actuating bar 92 that is welded crosswise on the link 87 has upright actuating fingers 92a and 92b at its two ends.

Turning now principally to FIGS. 2, 3, and 8, the cable drive C for the plow assembly P consists of a reversible electric motor 93 which is supported upon the mounting plate 61 and has a sheave 94 on its shaft to receive a toothed drive belt 95 which is also trained around a sheave 96 that is journalled upon a stub axle 97 carried in the upper beam 29 which is on the side opposite the power train for the conveyor belt B. Pinned to the sheave 96 is a sprocket 98, and trained around the sprocket 98 is a roller chain 99 which is also trained around a sprocket 100 that is keyed to a cross shaft 101 which is journalled in one of the upper beams 29 and in an upright plate 102 that is secured to the underside of the mounting plate 61. Keyed to the shaft 101 at the end opposite the sprocket 100 is a multiply grooved sheave 103 which provides the drive for a plow assembly cable 104 that is wound around the sheave 103 and around an idler sheave 105 in a double pass FIG. 8 style which is well known for such cable drives. As best seen in FIG. 8, the cable 104 has an upper run 104a that passes over a guide roller 106 which is carried between angle supports 107 on one of the arch weldments W that is nearest the second end portion A2 of the apparatus, extends above the top of the plow carriage frame 70, is trained around a sheave 108 that is journalled between angle brackets 109 on the arch weldment W adjacent the first end portion A1 of the apparatus, and is secured to an attaching eye at one end of the carriage frame 70. The cable also has a lower run 104b which passes beneath a guide roller 111 that is journalled alongside the guide roller 106, and the lower cable run 104b is connected to an eye 112 at the end of the plow carriage frame 70 which is opposite the eye 110. Thus, the plow assembly P may be pulled in either direction along the belt B by reversing the direction of rotation of the motor 93.

Plow Assembly Controls

Referring now particularly to FIGS. 8, 9 and 12 to 14, mounted on each of the arch weldments W is a switch arm 113 upon which a switch lever 114 is pivotally mounted in the path of travel of the plow carriage frame cross members 73. A mercury switch 115 is mounted upon each of the switch levers and suitably wired to controls for the cable drive reversing electric motor 93. Thus, when the plow assembly reaches either end of its path of travel, it pivots one of the switch levers 114 to throw a mercury switch 115 which acts to reverse the electric motor and drive the plow assembly in the opposite direction.

A mechanism that cooperates with the upright actuating fingers 92a and 92b of the plow assembly to reverse the plow plate 75 is indicated generally at 116, and is best seen in FIGS. 9, 10 and 12 to 14. The mechanism 116 is mounted upon a bracket 117 that is secured to the underside of the cross channel 64 of the arch weldment.

An upright pivot pin 118 on the bracket 117 provides a mounting for a hollow pivot boss 119 that carries a pair of arms 120 and 121 which are at an angle of about 155° to one another. A paddle 122 has a sleeve 122a by means of which it is pivotally mounted upon the arm 120, and a paddle 123 is mounted upon the arm 121 by a sleeve 123a. The paddles 122 and 123 have respective diagonal wings 122b and 123b at their inner ends, and respective right angle flanges 122c and 123c at their outer ends. As best seen in FIG. 10, the respective sleeves 122a and 123a have inclined outer ends 122d and 123d, and respective compression springs 124 and 125 bearing on the inner ends of the paddle sleeves bias the inclined sleeve ends against respective stop pins 126 and 127.

When an actuating finger 92a or 92b on the link 87 strike one of the paddles as the plow assembly is moving from right to left as seen in the drawings, the paddle is free to swing rearwardly, but as soon as it is released the inclined tube face, urged against the pin by the compression spring, returns the paddle to its upright position.

Starting with the plow blade 75 in the position illustrated in FIG. 9 and the plow assembly P moving toward the plow reversing mechanism 116, when the actuating finger 92a contacts the paddle 123 it swings the arms 120, 121 from the position of FIG. 9 toward the position of FIG. 13 where the sleeve 123a abuts the channel member 64. The flange 123c at the outer end of the paddle 123 contacts the underside of the channel member 64 to prevent the paddle from pivoting rearwardly. As the plow assembly continues its movement toward the reversing position where the frame cross member 73 strikes the switch lever 114, the actuating finger 92a slides across the paddle 123 which pivots the link 87 counter clockwise. The pin 90 on the link 87 traverses the slot 91 in the plow plate. Channel 82 and this action, which ends with the pin 90 against the inner end of the slot 91, swing the plow plate through the position of FIG. 13 to that of FIG. 14 while the finger 92a slides off the diagonal inner end portion 123b of the paddle 123 and the actuating finger 92b swings the paddle 122 rearwardly to pass beneath it.

As the plow assembly P moves toward the right, the fingers 92a and 92b both pivot the respective paddles 122 and 123 so as to pass beneath them.

Next time the plow assembly P reaches the reversing mechanism 116 the actuating finger 92b strikes the paddle 122, and the above described action is reversed to return the plow plate 75 to the position of FIG. 9.

Preferably the plow carriage frame 70 is enclosed by sheet metal plates (not shown), which are mounted on the frame in the same way previously described for the housings at the end positions A1 and A2 of the apparatus—i.e., wood 2×6's are cut to match the length of the frame and are seated in channel members that are fixed to the legs 71. Then metal side plates are secured to the 2×6's and a metal top plate is fastened to the side plates.

If it is necessary to enclose the sides of the apparatus the same system is used—i.e., 2×6's are mounted in channel members that are fixed to the arch weldments W and to the frame structures at the end portions A1 and A2; and side panels are secured to the 2×6's, to the arch weldment legs 62, and to corresponding parts of the frame and parts.

The foregoing detailed description is given for clearness of understanding only and no unnecessary limitations should be understood therefrom, as modifications will be obvious to those skilled in the art.

We claim:

1. In an endless belt conveyor apparatus that includes a supporting frame carried upon several longitudinally spaced supporting standards that include cross members, an endless belt carried on the frame; said endless belt having an upper carrying run and a return run, means at a first end portion of said endless belt to pour bulk material onto said upper carrying run, and means for driving the belt from said first end portion toward a second end portion for discharge of material to a bulk material receiving means that is in a plane below that of the standards cross members, the improvement comprising:

said frame comprises first and second end assemblies each carried upon certain ones of said standards at the respective first and second end portions of the belt, a pair of parallel longitudinal box-like tracks that form longitudinally uninterrupted carrier rails flanking the endless belt in a plane below the upper carrying run, said box-like tracks having uninterrupted trolley supporting portions that flank a continuous longitudinal split in the lower part of the track and also having uninterrupted trolley guiding and confining portions that flank said supporting portions and extend upwardly therefrom, and said box-like tracks having first and second end portions supported respectively directly upon said first and second end assemblies and extending continuously therebetween and said carrier rails being supported between said end assemblies solely by certain other ones of said standards, and means supporting the endless belt on said carrier rails.

2. The improvement of claim 1 in which the box-like tracks are circular in cross section.

3. The improvement of claim 2 in which the carrier rails consist of a plurality of longitudinally aligned rail lengths that have substantially abutting adjacent ends, there is a standard located at the adjacent ends of each two rail lengths, there is a pair of brackets on each standard, each of said brackets comprising a split collar in which the adjacent end portions of two rail lengths are telescopingly received, and interfitting parts of the split collars and the rail length align the splits in the rail lengths with those in the collars.

4. The improvement of claim 3 in which a transverse web connects the split collars on a standard, and the carrying run of the belt conveyor is supported on said transverse web.

5. The improvement of claim 4 in which each transverse web is in the form of a shallow, upwardly concave arc, and the carrying run of the belt conveyor curves downwardly to conform to said arc.

6. The improvement of claim 1 in which the carrier rails consist of a plurality of longitudinally aligned rail lengths that have substantially abutting adjacent ends, there is a standard located at the adjacent ends of each two rail lengths, there is a pair of brackets on each standard, each of said brackets comprising a fitting in which the adjacent end portions of two rail lengths are telescopingly received, and interfitting parts of the fittings and the rail lengths align both the trolley supporting portions and the trolley guiding and confining portions of adjacent rail lengths.

7. The improvement of claim 1 which includes integral, depending guide members on the carrier rails between which the return run of the endless belt conveyor is guided.

8. The improvement of claim 1 in which said second end assembly includes side beams that support the second ends of the carrier rails, a bridge frame on said side beams that includes upper beams surmounting the side beams and a drive motor support plate mounted on the upper beams spanning the second end portion of the belt.

9. The improvement of claim 1 in which a driven roller carries the second end of the belt, the means for driving the belt includes a motor operatively connected to said driven roller, in which an idler roller carries the first end of the belt, and which includes means for moving said idler roller in a translatory manner to adjust tension of the belt.

10. The improvement of claim 9 in which the means for moving the idler roller includes a pair of guideways fixed to the supporting frame and extending lengthwise relative to the belt, an idler roller carrier assembly that includes support rails slidably mounted in said guideways, means journalling the idler roller in an end of said support rails remote from the driven roller, a manually rotatable cross shaft journalled in brackets on the guideways, and means operatively connecting the cross shaft to the idler roller carrier assembly so that rotation of the cross shaft in a predetermined direction moves said carrier assembly in the guideways to increase the distance between the idler roller and the driven roller.

11. The improvement of claim 10 in which the means operatively connecting the cross shaft to the idler roller carrier assembly comprises an adjusting cable that has one end portion wrapped around the cross shaft, and a tension spring connecting the other end of the adjusting cable to the idler roller carrier assembly at an end opposite the idler roller, and rotation of the cross shaft in said predetermined direction winds the adjusting cable onto the shaft.

12. The improvement of claim 1 in which transverse belt support webs are supported by on said certain other ones of said standards, and means connect said carrier rails to said webs.

13. The improvement of claim 12 in which each transverse belt support web is in the form of a shallow, upwardly concave arc, and the carrying run of the belt conveyor curves downwardly to conform to said arc.

14. In an endless belt type animal feeding apparatus that includes a supporting frame carried upon several longitudinally spaced supporting standards that include cross members, an endless belt carried on the frame, said endless belt having an upper carring run and a return run, means at a first end portion of said endless belt to pour bulk material onto said upper carrying run, means for driving the belt from said first end portion toward a second end portion, a plow assembly that reciprocates lengthwise of the belt to divert bulk material from both sides of said upper carrying run, and an animal feed bunk beneath said standards cross members and said conveyor to receive all of said diverted bulk material, the improvement comprising:

said frame comprises first and second end assemblies each carried upon certain ones of said standards at the respective first and second end portions of the belt, a pair of parallel longitudinal box-like tracks that form longitudinally uninterrupted carrier rails flanking the endless belt in a plane below the upper carrying run, said box-like tracks having uninterrupted trolley supporting portions that flank a continuous longitudinal split in the lower part of the track and also having uninterrupted trolley guiding and confining portions that flank said supporting portions and extend upwardly therefrom, and said box-like tracks having first and second end portions supported respectively directly upon said first and second end assemblies and extending continuously therebetween and said carrier rails being supported between said end assemblies solely by certain other ones of said standards, means supporting the endless belt on said carrier rails, a carriage for said reciprocating plow assembly, and wheeled trolleys on said carriage which ride on said trolley supporting portions between said trolley confining portions, said wheeled trolleys having depending carriage hangers extending through said continuous split, laterally outwardly projecting support arms on said hangers, and depending members on the carriage fixed to said support arms.

15. The improvement of claim 14 in which the box-like tracks are circular in cross section, each of the wheeled trolleys has a frame with wheels journalled at its end portions and a depending carriage hanger between the wheels, and said wheels are wide enough to rest in the track on both sides of a split in the track and have transversely curved running surfaces that make them self-centering in the tracks.

16. The improvement of claim 14 in which the carriage has a box-like frame that spans the carrier rails, the depending members are at opposite sides of the carrier rails and at opposite ends of said box-like frame, the box-like frame comprises longitudinal bars between the upper ends of the members at one side of the carriage and end cross bars between the upper ends of the members at each end of the carriage, a belt supporting pan in the lower part of the carriage underlies the carrying run of the endless belt, an intermediate cross bar connects the longitudinal bars, a plow plate is suspended from said intermediate cross bar on an upright pivot, a compression spring resiliently urges the plow plate against the endless belt, a link is operatively connected to the box-like frame and to the plow plate to swing the latter on the upright pivot between first and second positions extending diagonally across the belt in opposite directions, there are upright actuating fingers on the link, a plow control frame on one of the carrier rail supporting standards near the second end of the endless belt has a cross rail spanning the belt in a plane above that of the top of the box-like frame, and paddle means carried on an upright pivot on said cross rail is contacted by the actuating fingers to swing the plow plate between its first and second positions when the plow assembly is moving toward said second end of the endless belt.

17. The improvement of claim 16 which includes a cable drive for reciprocating the plow assembly, said cable drive including a reversible drive motor adjacent the second end of the endless belt, cable means operatively connected to the drive motor and to the cross bars of the box-like frame, a switch control frame on one of the carrier rail supporting standards near the first end of the endless belt, electrical switch means for reversing the drive motor, a first pivoted switch activator on the switch control frame which is contacted by the box-like frame as the plow assembly nears said switch control frame to reverse the drive motor, and a second pivoted switch activator on the plow control frame cross rail which is contacted by the box-like frame to reverse the drive motor.

18. The improvement of claim 17 in which said second end assembly includes side beams that support the second ends of the carrier rails, a bridge frame on said side beams that includes upper beams surmounting the side beams, a drive motor support plate mounted on the upper beams spanning the second end portion of the belt substantially in the plane of the plow control cross rail, the reversible drive motor is mounted on the drive motor support plate, and an endless drive belt drive motor is also mounted on said drive motor support plate.

19. The improvement of claim 14 in which the carriage has a frame that spans the carrier rails, the depending members are parts of the frame that flank the carrier rails and are fixed to the support arms at opposite ends of the frame, a belt supporting pan in the carriage underlies the carrying run of the endless belt, and a plow is supported on the carriage frame above the belt supporting pan.

* * * * *